United States Patent
Garner (10) Patent No.: US 12,101,854 B2
(45) Date of Patent: *Sep. 24, 2024

(54) CONTROL A DIMMING LEVEL OF AN ILLUMINATION LOAD BY A DIMMER DEVICE

(71) Applicant: ROKU, INC., San Jose, CA (US)

(72) Inventor: Gregory Mack Garner, Sunnyville, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,799

(22) Filed: May 10, 2023

(65) Prior Publication Data

US 2023/0363062 A1  Nov. 9, 2023

Related U.S. Application Data

(63) Continuation of application No. 17/848,796, filed on Jun. 24, 2022, now Pat. No. 11,690,149, which is a
(Continued)

(51) Int. Cl.
*H05B 45/12* (2020.01)
*H05B 45/10* (2020.01)
(Continued)

(52) U.S. Cl.
CPC ............ *H05B 45/12* (2020.01); *H05B 45/10* (2020.01); *H05B 45/30* (2020.01); *H05B 45/305* (2020.01);
(Continued)

(58) Field of Classification Search
CPC ........ H05B 45/12; H05B 45/10; H05B 45/30; H05B 45/305; H05B 45/32; H05B 47/11;
(Continued)

(56) References Cited

U.S. PATENT DOCUMENTS

| | | | | |
|---|---|---|---|---|
| 11,375,588 B1 | * | 6/2022 | Garner | H05B 45/59 |
| 2012/0206050 A1 | * | 8/2012 | Spero | H05B 45/395 |
| | | | | 315/152 |
| 2014/0228914 A1 | * | 8/2014 | van de Ven | A61N 5/0618 |
| | | | | 607/88 |
| 2014/0265880 A1 | * | 9/2014 | Taipale | H05B 47/11 |
| | | | | 315/246 |

(Continued)

FOREIGN PATENT DOCUMENTS

| | | |
|---|---|---|
| CN | 101617405 A | 12/2009 |
| CN | 102333404 A | 1/2012 |

(Continued)

OTHER PUBLICATIONS

International Search Report and Written Opinion, for PCT Appl. No. PCT/US2022/080057, 10 pages, mailed Feb. 3, 2023.

*Primary Examiner* — Abdullah A Riyami
*Assistant Examiner* — Syed M Kaiser
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a dimmer device including a driver, and a controller communicatively coupled to the driver and to a monitor device. The monitor device can include a camera and is configured to take a plurality of images of the illumination load. The controller provides a control signal that indicates to the driver to adjust power supplied to an illumination load. The control signal is provided in response to a determination that a performance of the illumination load fails to satisfy a predetermined performance indicator. The performance of the illumination load is determined based on information related to the plurality of images of the illumination load taken by the camera of the monitor device. The controller can adjust a dimming level of the illumination load by providing the control signal to the driver.

20 Claims, 7 Drawing Sheets

Related U.S. Application Data continuation of application No. 17/529,940, filed on Nov. 18, 2021, now Pat. No. 11,375,588.

(51) Int. Cl.
*H05B 45/30* (2020.01)
*H05B 45/305* (2020.01)
*H05B 45/32* (2020.01)
*H05B 47/11* (2020.01)
*H05B 47/125* (2020.01)

(52) U.S. Cl.
CPC .............. *H05B 45/32* (2020.01); *H05B 47/11* (2020.01); *H05B 47/125* (2020.01)

(58) Field of Classification Search
CPC .... H05B 47/125; H05B 45/59; H05B 45/325; H05B 47/105
See application file for complete search history.

(56) References Cited

U.S. PATENT DOCUMENTS

| | | | |
|---|---|---|---|
| 2016/0097522 A1* | 4/2016 | Chien | F21V 33/00 362/183 |
| 2018/0373094 A1* | 12/2018 | Ryoo | G02F 1/133603 |
| 2019/0081563 A1* | 3/2019 | Yang | H02P 7/292 |
| 2019/0320515 A1* | 10/2019 | Sadwick | H05B 45/00 |
| 2021/0400227 A1* | 12/2021 | Wong | H04N 21/4348 |

FOREIGN PATENT DOCUMENTS

| | | | | |
|---|---|---|---|---|
| CN | 104320881 A | | 1/2015 | |
| JP | 2014032944 A | * | 2/2014 | ......... H05B 33/0857 |
| KR | 10-2011-0077783 A | | 7/2011 | |
| KR | 10-1453806 B1 | | 10/2014 | |
| KR | 10-1673764 B1 | | 11/2016 | |
| KR | 10-1688159 B1 | | 12/2016 | |

* cited by examiner

CONTROL A DIMMING LEVEL OF AN ILLUMINATION LOAD BY A DIMMER DEVICE

RELATED APPLICATION

This application is a continuation of U.S. patent application Ser. No. 17/848,796, filed on Jun. 24, 2022, which is a continuation of U.S. patent application Ser. No. 17/529,940, filed on Nov. 18, 2021, now allowed as U.S. Pat. No. 11,375,588, which are both incorporated by references herein in their entireties.

BACKGROUND

Field

This disclosure is generally directed to modifying graphics rendering by transcoding a serialized command stream.

Background

Lights are essential in daily lives. A light source (e.g., a lamp or a luminaire) can be generally referred to as an illumination load. There are many kinds of electric lighting technologies, such as an incandescent light, a halogen light, a metal halide light, a fluorescent light, a light emitting diode (LED) light, a red, blue and green (RGB) LED light, or more. LED lighting continues to take market share from the traditional lighting, due to the advantages of solid state lighting.

In general, dimming an illumination load refers to the property of a light source to vary its intensity and brightness, and adjust the diming level between a fully on level and a minimum value level for the light source. Dimming is a useful technology in the lighting industry. There are many kinds of dimmer devices performing the dimming functions. However, how to control the dimming level of an illumination load is still a challenge.

SUMMARY

Provided herein are system, apparatus, article of manufacture, method and/or computer program product embodiments, and/or combinations and sub-combinations thereof, for a dimmer device to change a diming level of an illumination load based on a determination that a performance of the illumination load does not meet a predetermined performance indicator. The performance of the illumination load is determined based on information related to a plurality of images of the illumination load taken by a camera of a monitor device.

An example embodiment of a dimmer device can include a driver configured to be coupled to an illumination load, and a controller communicatively coupled to the driver and to a monitor device. The monitor device can include a camera and is configured to take a plurality of images of the illumination load. The controller is configured to provide a control signal that indicates to the driver to adjust power supplied to the illumination load. The control signal is provided in response to a determination that a performance of the illumination load fails to satisfy a predetermined performance indicator. The performance of the illumination load is determined based on information related to the plurality of images of the illumination load taken by the camera of the monitor device. The controller is further configured to adjust a dimming level of the illumination load by providing the control signal to the driver.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A lighting system may include a control device to control one or more light sources to light a space. A light source, such as a lamp, a luminaire, or a light emitting diode (LED) light, can be generally referred to as an illumination load. Dimming an illumination load refers to the property of a light source to vary its intensity and brightness, and adjust the diming level between a fully on level and a minimum value level for the light source. A dimmer device can perform the dimming control function for one or more illumination loads. LED lighting continues to take market share from the traditional lighting, due to the advantages of solid state lighting. The LED dimming control can save energy, customize light scenes, control color tuning of the lights, extend the service life of the LED lights, among many other advantages.

A major issue plaguing the lighting industry is flicker, which is defined as "variations of luminance in time" in The Lighting Handbook, published by the Illuminating Engineering Society of North America (IESNA). Flicker may be inherent to the design of a luminaire but can also be introduced by external factors. There are two primary types of flicker: visible and invisible. Visible flicker is consciously observed by humans and is typically considered objectionable except in some special applications like stroboscopic lights. Invisible flicker is not consciously perceived but may still have biological or even health effects on humans such as reduced visual task performance, apparent slowing or stopping of motion (stroboscopic effect), unstable light output in video applications, and distraction.

Accordingly, it is important to reduce the flickers for any light source. Flicker may become an even more serious issue to LED lights controlled by a dimmer device. Any dimmer device, such as a wall-box dimmer, can have the potential for additional flickers caused by system mismatch or other factors. Traditionally, based on a user's perception, a dimmer device may use a mechanical switch to enable the dimmer device to change the diming level of the illumination load. However, such a mechanical switch of a dimmer device may have limited potential in reducing the flickers, since the control of the mechanical switch based on a user's perception of the flicker can be unreliable.

Various embodiments of this disclosure may provide a dimmer device to change a diming level of an illumination load based on information provided by a monitor device. In some embodiments, the monitor device can include a camera to take a plurality of images of the illumination load. The performance of the illumination load can be determined based on information related to the plurality of images of the illumination load taken by the camera of the monitor device. In addition, the dimmer device or the monitor device can determine that the performance of the illumination load does not meet a predetermined performance indicator, based on information provided by the monitor device. Accordingly, the dimmer device can provide a control signal to adjust power supplied to the illumination load, and further provide the control signal to a driver to adjust a dimming level of the illumination load. In some embodiments, the plurality of images of the illumination load can be taken by the camera of the monitor device according to a first frequency, and the illumination load is a LED light having a second frequency, where the first frequency is higher than the second frequency.

Figure 1A:
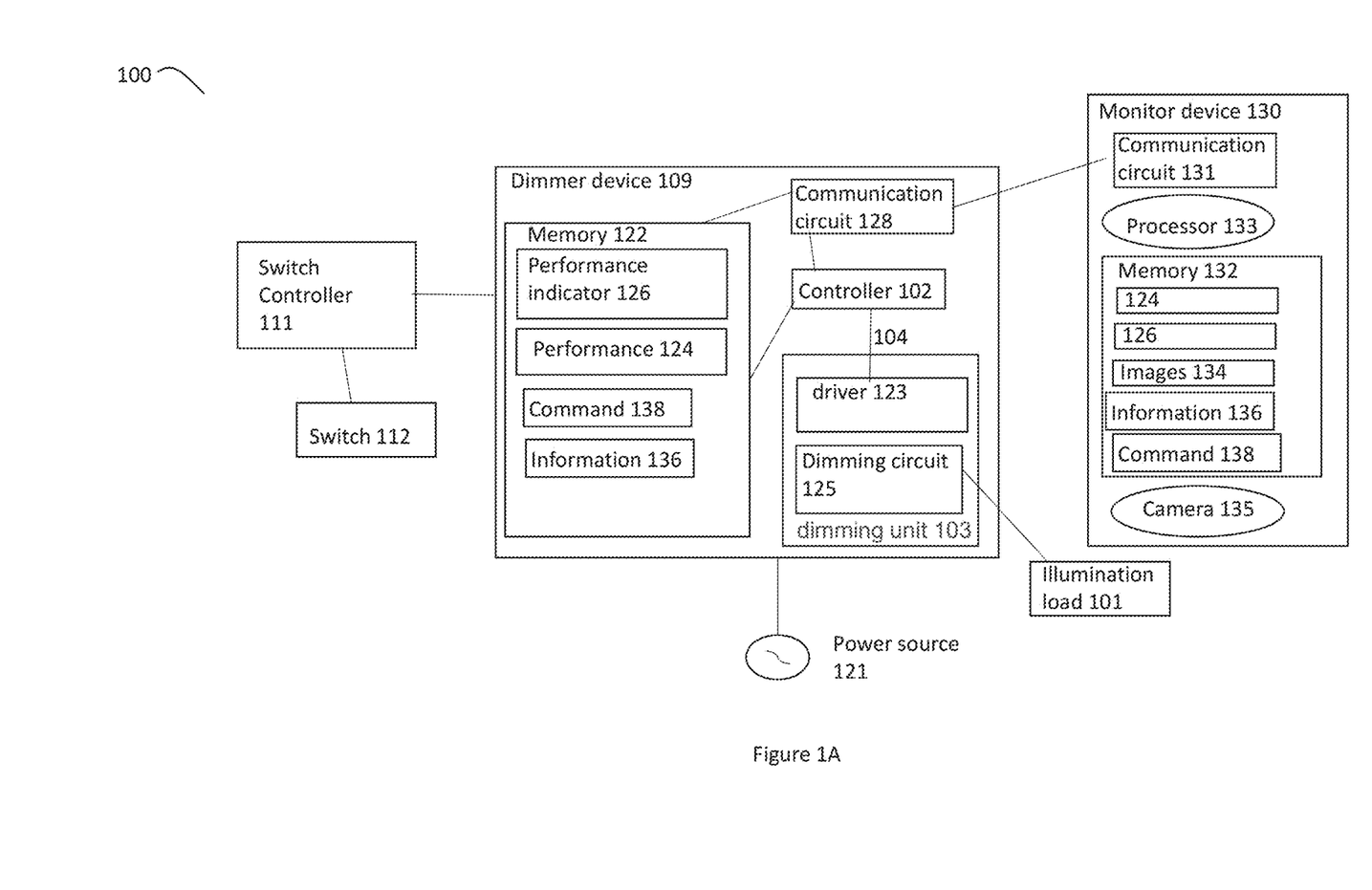
FIGS. 1A-1B illustrate a lighting system including a dimmer device to adjust a diming level of an illumination load based on a plurality of images of the illumination load taken by a camera of a monitor device, according to some embodiments.
Figure 1B:
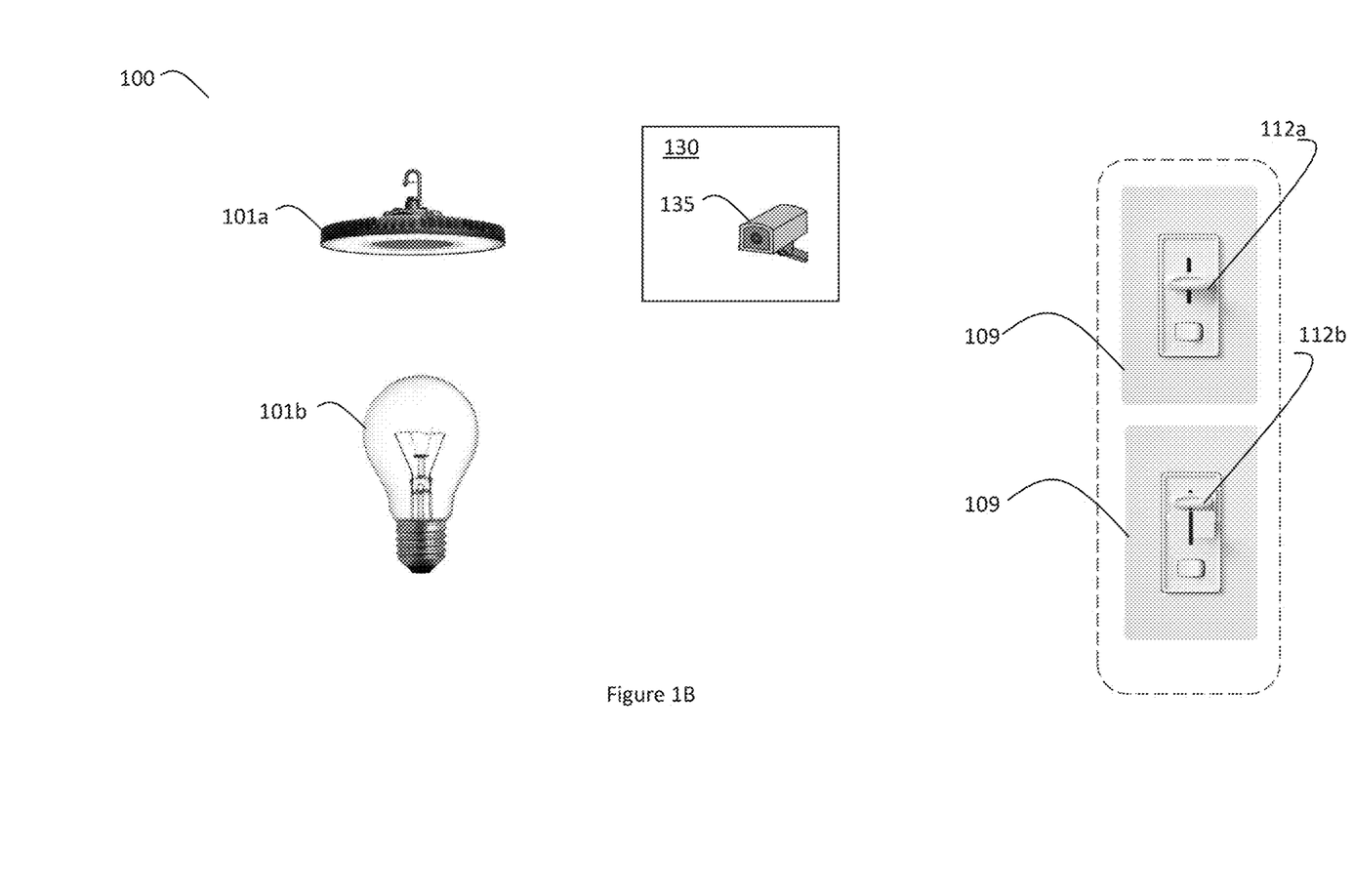

FIGS. 1A-1B illustrate a lighting system 100 including a dimmer device to adjust a diming level of an illumination load based on a plurality of images of the illumination load taken by a camera of a monitor device, according to some embodiments. It is noted, however, that lighting system 100 is provided solely for illustrative purposes, and is not limiting. Embodiments of this disclosure may be implemented using and/or may be part of lighting systems different from and/or in addition to lighting system 100, as will be appreciated by persons skilled in the relevant art(s) based on the teachings contained herein. An example of lighting system 100 shall now be described.

In some embodiments, lighting system 100 can be placed in a stage lighting area, a studio lighting area, a TV and movie lighting area, an office, an industrial space, a hospital, a classroom, or many other locations. Lighting system 100 may include an illumination load 101 controlled by a dimmer device 109. A switch 112 can be coupled to dimmer device 109 through a switch controller 111. In addition, a monitor device 130 can be communicatively coupled to dimmer device 109 through a wired or wireless connection. A power source 121 can be electrically connected to dimmer device 109. Dimmer device 109 can turn on the illumination load 101 using power supplied from the power source 121 (e.g., commercial power supply of AC 100 V to 277 V). A power source, not shown, can be electrically connected to switch controller 111 to supply power to various control devices electrically connected to switch controller 111.

In some embodiments, illumination load 101 can include an incandescent light, a halogen light, a metal halide light, a fluorescent light, a light emitting diode (LED) light, or a red, blue and green (RGB) LED light, such as 101a and 101b as shown in FIG. 1B. An LED light can have LED elements as a light source. The LED elements can be dimmed to low illuminance compared to fluorescent lamps. However, when the LED elements illuminate at low illuminance, unevenness in brightness or flickering becomes visible due to large deviation of lights emitted from the LED elements. In addition, when the LED elements illuminate at high illuminance, dazzling or glaring is likely to be perceived due to the light-emitting characteristic of LEDs.

In some embodiments, switch 112 can be a mechanical switch and can serve as an operation unit for turning on/off the illumination load 101 and/or for changing a dimming level of the illumination load 101. Switch 112 can include a plurality of switches. When switch 112 is operated, switch 112 can send a multiplexed transmission signal corresponding to the operation of switch 112, e.g., positions of switch 112a and switch 112b as shown in FIG. 1B, to switch controller 111. Switch controller 111 can generate a control signal to be processed by dimmer device 109. Some conventional dimmer device 109 may only include a mechanical switch as shown in FIG. 1B. In embodiments herein, monitor device 130 can provide additional control to dimmer device 109 in addition to switch 112.

In some embodiments, monitor device 130 can be communicatively coupled to dimmer device 109 through a wired or wireless connection. Monitor device 130 can include a camera 135, a processor 133, a memory 132, and a communication circuit 131. Camera 135 can take a plurality of images 134 of illumination load 101. Images 134 can be a collection of discrete and individual photo images, a collection of video images, or any other multimedia images. Images 134 can also include any audio signals, such as noises generated by illumination load 101. Information 136 related to the plurality of images 134 of illumination load 101 can be processed by processor 133.

Figure 4:
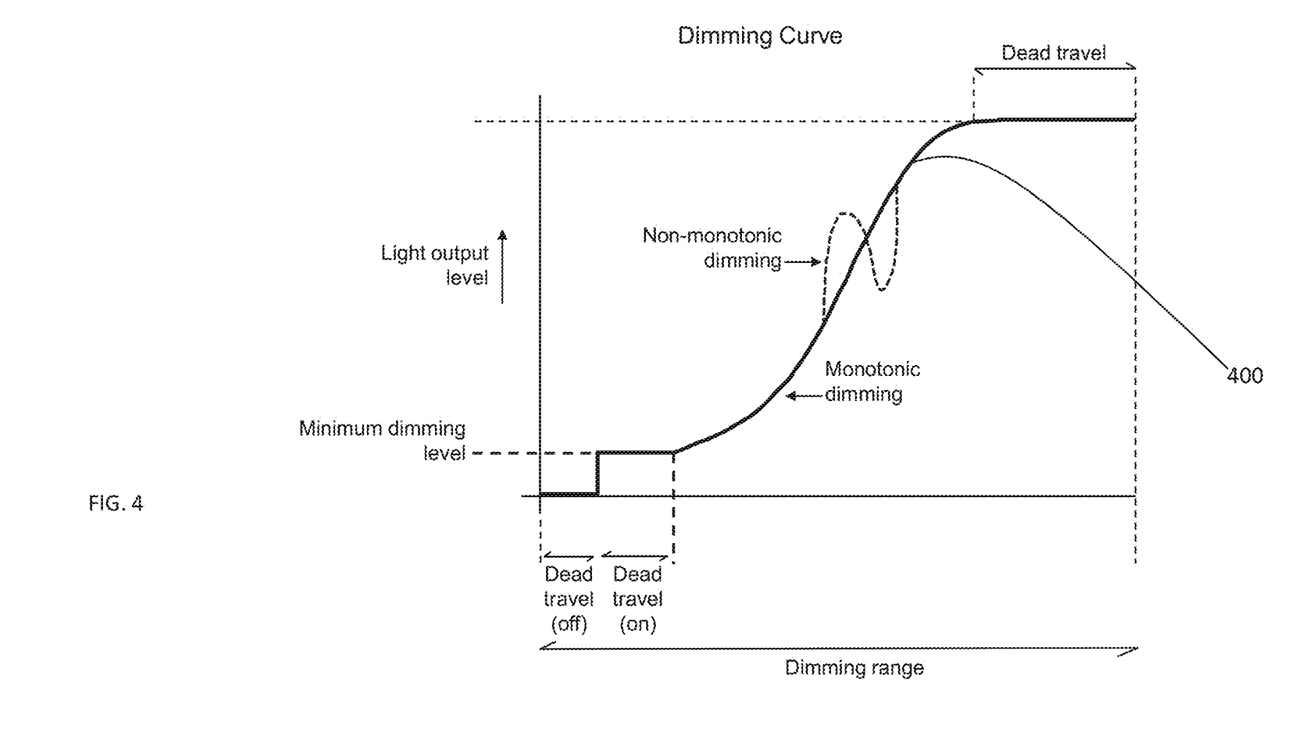
FIG. 4 illustrates an example dimming curve for a light emitting diode (LED) light, according to some embodiments.

Based on images 134 or information 136 related to the plurality of images 134, processor 133 can determine that a performance 124 of the illumination load 101 fails to satisfy a predetermined performance indicator 126. Performance of illumination load 101 can be determined by processor 133, and can be related to a flicker percentage, a flicker index, or a flicker frequency. Predetermined performance indicator 126 can be associated with a dimming curve, as shown in FIG. 4, which includes a maximum dimming level, minimum dimming level, dead travel, or a rate of change of light output for the illumination load. Predetermined performance indicator 126 can be programmed into monitor device 130 or received from dimmer device 109.

Once processor 133 determines that performance 124 of the illumination load 101 fails to satisfy predetermined performance indicator 126, processor 133 can generate a command 138 to be transmitted to dimmer device 109 to determine the control signal 104 based on the received command 138 from monitor device 130. Additionally and alternatively, processor 133 can transmit to dimmer device 109 information 136 that is related to the plurality of images 134 of the illumination load 101. Dimmer device 109 can calculate performance 124, compare performance 124 with predetermined performance indicator 126, generate control signal 104 when dimmer device 109 determines that performance 124 of the illumination load 101 fails to satisfy predetermined performance indicator 126.

Figure 2A:
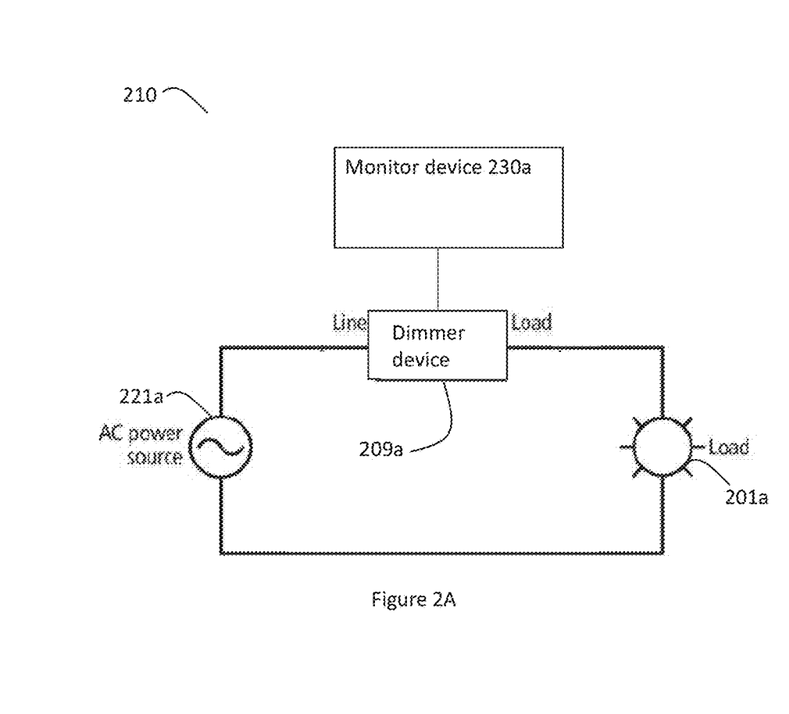
FIGS. 2A-2C illustrate example lighting systems including a dimmer device to adjust a diming level of an illumination load based on a plurality of images of the illumination load taken by a camera of a monitor device, according to some embodiments.
Figure 2B:
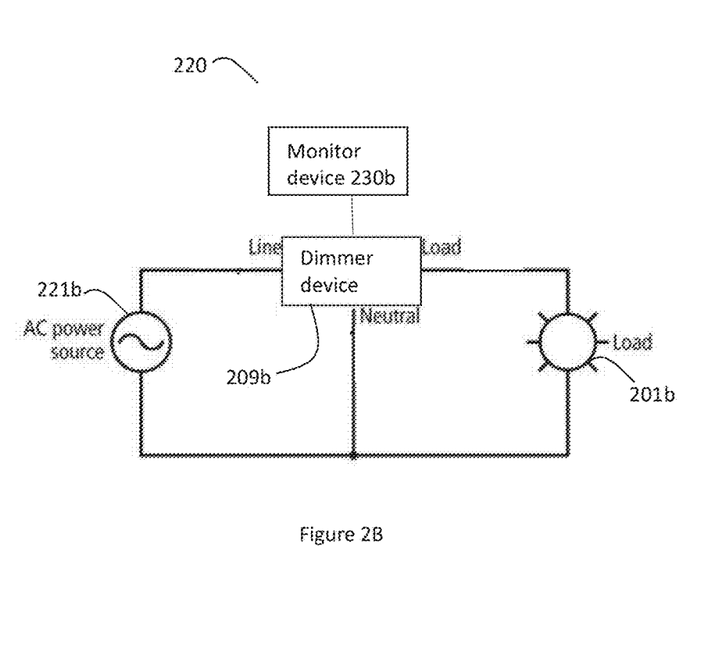
Figure 2C:
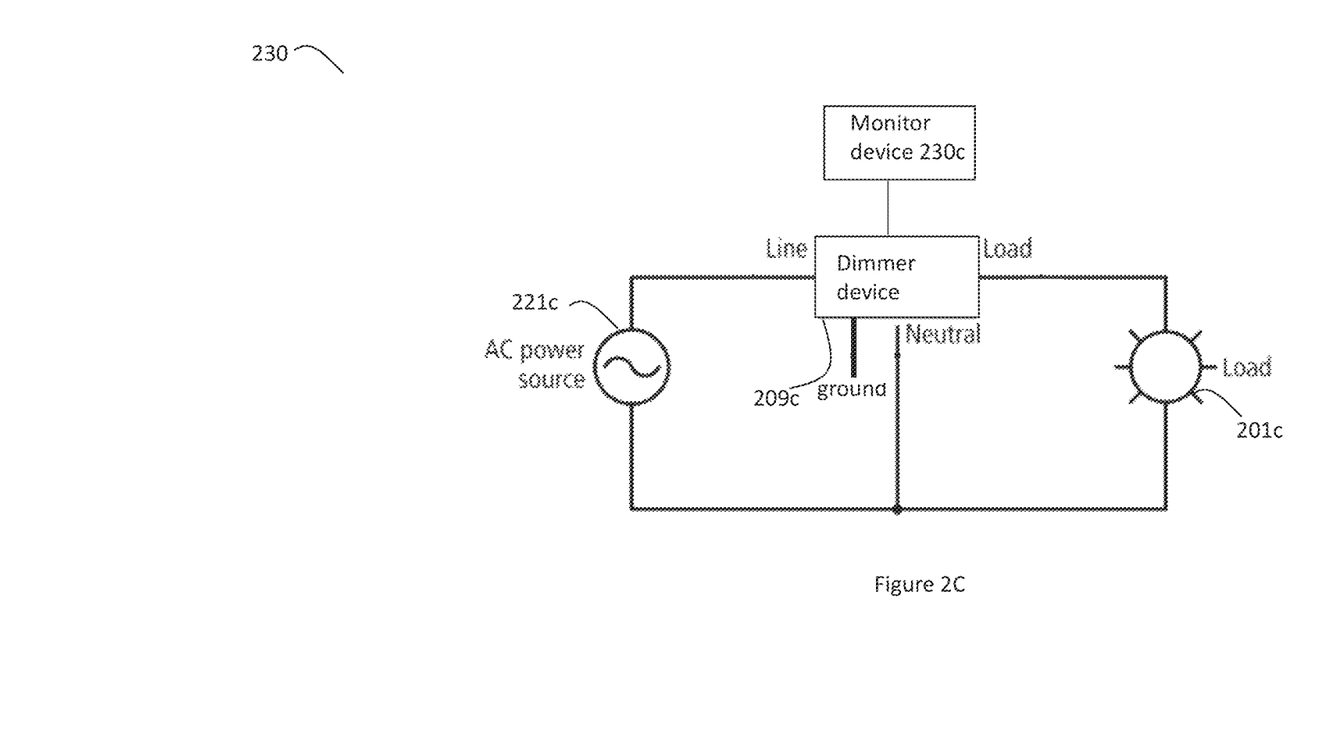

In some embodiments, dimmer device 109 can include a 2-way dimmer switch, a triode for alternating current (TRIAC) dimmer switch, an Electronic Low Voltage (ELV) dimmer switch, a 3-way dimmer switch, a 4-way dimmer switch, or any other dimmer device. More details of dimmer device 109 are shown in FIGS. 2A-2C. In some embodiments, monitor device 130 can be located within dimmer device 109, and together forming an integrated device. In some other embodiments, monitor device 130 can be separated from dimmer device 109. In some embodiments, monitor device 130 can be implemented on a mobile phone, and camera 135 can be located in the mobile phone, while dimmer device 109 can be mounted on a wall. Communication between monitor device 130 and dimmer device 109 can be based on a wireless technology.

Dimmer device 109 can receive the control signal from switch controller 111 and perform control over illumination load 101. Similarly, dimmer device 109 can receive command 138 or information 136 from monitor device 130, so that dimmer device 109 can perform control over illumination load 101.

Dimming device 109 can includes a controller 102, a dimming unit 103, a communication circuit 128, and a memory 122. Dimming unit 103 includes a driver 123 and a dimming circuit 125. Dimming device 109 as shown includes one dimming unit 103, but may include a plurality of dimming units. Further, dimming unit 103 may be configured to dim a plurality of illumination loads.

Controller 102 can provide control signal 104 to driver 123. Control signal 104 can be a forward phase signal, reverse phase signal, a 3-wire control signal, a 0-10V control signal, a digital addressable lighting interface (DALI) control signal, a digital multiplex (DMX) control signal, a pulse-width modulation (PWM) control signal, or other dimming control signal. Controller 102 can include a microcomputer and the like. Controller 102 can be operated by reading out a program stored in a ROM and executing the program. Controller 102 performs a dimming control over illumination load 101 by controlling dimming unit 103 according to the control signal 104.

Within dimming unit 103, driver 123 can be connected to dimming circuit 125 and controls the dimming circuit 125 to change the dimming level of the illumination load 101. The driver 123 controls a timing for turning on/off the semiconductor switch (a conduction angle with respect to the frequency of power) to adjust power supplied to the illumination load 101, thereby dimming the illumination load 101. Driver 123 can be a constant voltage (CV) driver, a constant current reduction driver, or a pulse-width modulation (PWM) driver.

Dimming circuit 125 controls power supplied to the illumination load 101. Dimming circuit 125 can include a semiconductor switch, such as a field-effect transistor (FET) or a TRIAC that allows alternating current to flow bi-directionally. Dimming device 109 performs dimming control over the illumination load 101 in a power-controlled manner or in a signal-controlled manner. The power-controlled manner includes a phase control scheme based on in-phase and a phase control scheme based on anti-phase. In some embodiments, a semiconductor switch, such as a FET or a TRIAC can be used as dimming circuit 125 to turn on at the timing of zero crossing of AC voltage from a power source.

In some embodiments, controller 102 can be configured to determine control signal 104 to change a diming level of illumination load 101 by controlling driver 123 to adjust an on time and an off time for illumination load 101 or adjust power supplied to illumination load 101, in response to a determination that performance 124 of illumination load 101 does not meet predetermined performance indicator 126. Performance 124 of illumination load 101 can be determined based on the plurality of images 134 of illumination load 101 taken by camera 135 of monitor device 130. Controller 102 can be further configured to adjust driver 123 based on control signal 104 to change the diming level of illumination load 101. In some embodiments, controller 102 can determine control signal 104 based on received command 138 from monitor device 130. Control signal 104 can indicate to driver 123 to adjust the power by adjusting an on time and an off time duty cycle for the illumination load. In some other embodiments, controller 102 can determine, based on the received information 136, performance 124 of illumination load 101 does not meet predetermined performance indicator 126, and generate control signal 104 to change the diming level of illumination load 101.

FIGS. 2A-2C illustrate example lighting system 210, lighting system 220, and lighting system 230, including a dimmer device to adjust a diming level of an illumination load based on a plurality of images of the illumination load taken by a camera of a monitor device, according to some embodiments. Lighting system 210, lighting system 220, and lighting system 230 can be examples of lighting system 100 as shown in FIG. 1A.

In some embodiments, as shown in FIG. 2A, lighting system 210 includes an illumination load 201*a* controlled by a dimmer device 209*a*, and a monitor device 230*a*. Monitor device 230*a* can communicate with dimmer device 209*a* through a wired or wireless connection. A power source 221*a* can be electrically connected to dimmer device 209*a*. Dimmer device 209*a* can turn on illumination load 201*a* using power supplied from power source 221*a*. Illumination load 201*a*, dimmer device 209*a*, monitor device 230*a*, and power source 221*a* can be examples of illumination load 101, dimmer device 109, monitor device 130, and power source 121, respectively, as shown in FIG. 1.

In some embodiments, dimmer device 209*a* can include a 2-way dimmer switch. Dimmer device 209*a* can be coupled to power source 221*a* through a line connection, and coupled to illumination load 201*a* through a load connection.

In some embodiments, as shown in FIG. 2B, lighting system 220 includes an illumination load 201*b* controlled by a dimmer device 209*b*, and a monitor device 230*b*. Monitor device 230*b* can communicate with dimmer device 209*b* through a wired or wireless connection. A power source 221*b* can be electrically connected to dimmer device 209*b*. Dimmer device 209*b* can turn on illumination load 201*b* using power supplied from power source 221*b*. Illumination load 201*b*, dimmer device 209*b*, monitor device 230*b*, and power source 221*b* can be examples of illumination load 101, dimmer device 109, monitor device 130, and power source 121, respectively, as shown in FIG. 1.

In some embodiments, dimmer device 209*b* can include a 3-way dimmer switch. Dimmer device 209*b* can be coupled to power source 221*b* through a line connection, coupled to illumination load 201*b* through a load connection, and further coupled to a neutral line.

In some embodiments, as shown in FIG. 2C, lighting system 230 includes an illumination load 201*c* controlled by a dimmer device 209*c*, and a monitor device 230*c*. Monitor device 230*c* can communicate with dimmer device 209*c* through a wired or wireless connection. A power source 221*c* can be electrically connected to dimmer device 209*c*. Dimmer device 209*c* can turn on illumination load 201*c* using power supplied from power source 221*c*. Illumination load 201*c*, dimmer device 209*c*, monitor device 230*c*, and power source 221*c* can be examples of illumination load 101, dimmer device 109, monitor device 130, and power source 121, respectively, as shown in FIG. 1.

In some embodiments, dimmer device 209*c* can include a 4-way dimmer switch. Dimmer device 209*c* can be coupled to power source 221*c* through a line connection, coupled to illumination load 201*c* through a load connection, and further coupled to a neutral line and a ground line.

Figure 3:
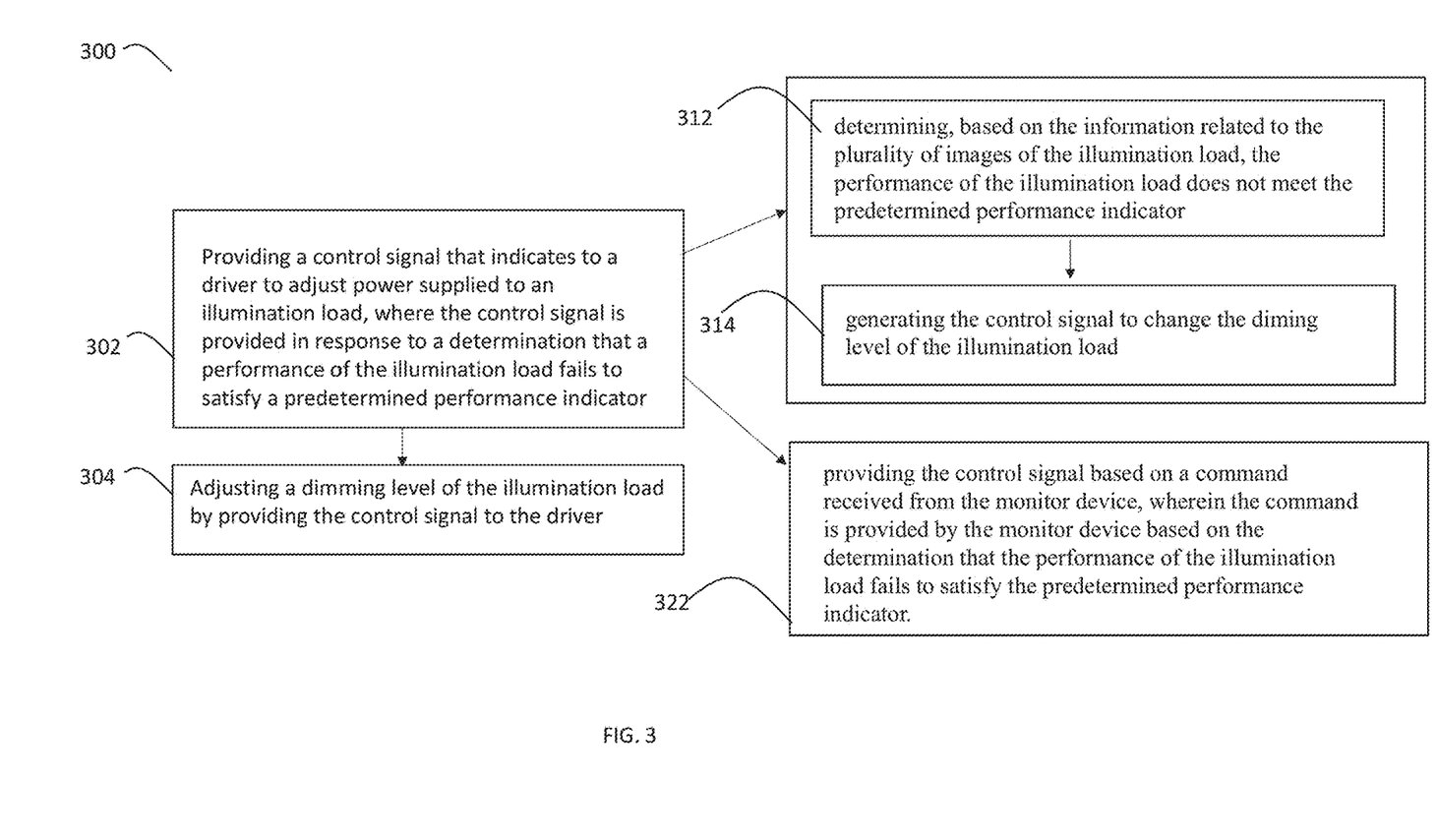
FIG. 3 illustrates an example process for adjusting a diming level of an illumination load based on a plurality of images of the illumination load taken by a camera of a monitor device, according to some embodiments.

FIG. 3 illustrates an example process 300 for adjusting a diming level of an illumination load based on a plurality of images of the illumination load taken by a camera of a monitor device, according to some embodiments. Processes 300 can be performed by processing logic of controller 102 that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, controller 102 can provide a control signal that indicates to a driver to adjust power supplied to an illumination load. The control signal can be provided in response to a determination that a performance of the illumination load fails to satisfy a predetermined performance indicator. For example, as described for FIG. 1A, controller 102 can provide control signal 104 that indicates to driver 123 to adjust power supplied to illumination load 101. Control signal 104 can be provided in response to a determination that performance 124 of illumination load 101 fails to satisfy predetermined performance indicator 126.

Operations at 302 can be implemented in various ways. In some embodiments, monitor device 130 only transmits information 136 related to the plurality of images 134 of illumination load 101 to controller 102, and controller 102 determines, based on information 136, performance 124 of illumination load 101. In some embodiments, monitor device 130 can transmit the plurality of images 134 of illumination load 101 to controller 102, and controller 102 determines, based on the plurality of images 134, performance 124 of illumination load 101. Controller 102 further determines whether performance 124 meets predetermined performance indicator 126. As shown at 312, controller 102 can determine, based on information 136 related to the plurality of images 134 of illumination load 101, performance 124 of illumination load 101 does not meet predetermined performance indicator 126; and at 314, controller 102 can generate control signal 104 to change the diming level of illumination load 101.

In some embodiments, monitor device 130 determines, based on the plurality of images 134, the performance 124 of illumination load 101. Monitor device 130 further determines whether performance 124 meets predetermined performance indicator 126, and further provides command 138 to controller 102. At 322, controller 102 can provide control signal 104 based on command 138 received from monitor device 130. Operations shown at 312, 314, and 322 are merely examples of various implementations of operations at 302. There can be other implementations known to a person having ordinary skills in the art. At 304, controller 102 can adjust a dimming level of illumination load 101 by providing control signal 104 to driver 123.

In some embodiments, control signal 104 is provided to change a diming level of illumination load 101 by controlling driver 123 to adjust an on time and an off time for illumination load 101 or adjust power supplied to illumination load 101. Control signal 104 can be a forward phase signal, reverse phase signal, a TRIAC dimmer control signal, an ELV dimmer control signal, a 3-wire control signal, a 0-10V control signal, a DALI control signal, a DMX control signal, or a PWM control signal.

In some embodiments, a TRIAC dimmer can be designed for incandescent and halogen lamps and the ELV dimmer can be designed for electronic low voltage halogen lights. A 0-10V analog dimming can be used in the lighting industry in commercial applications where the 0-10V dimmer simply provides a low voltage DC signal to the lighting fixture, which ranges from 0V to 10V. The DALI standard defined in IEC 62386 is a digital protocol that enables the control of lighting fixtures in building automation applications via a bus architecture where a controller addresses individual or groups of lights for control and status purposes. A DMX dimmer is based on a digital communications standard used to control theatrical and stage lighting. A DMX dimmer offers the same advantages to lighting controls as DALI does. A PWM dimmer can be a digital dimming scheme that is implemented by driving the LEDs with a square wave current waveform. Unlike constant current reduction where the driver reduces the output current to dim the lights, the PWM signal waveform swings the LED current from full on to off. By adjusting the duty cycle of the waveform, e.g., the on time, the average current going into the LEDs is changed which causes the lights to dim.

In some embodiments, control signal 104 can be provided in response to a determination that performance 124 of illumination load 101 does not meet predetermined performance indicator 126. There can be many different ways to define performance 124 and predetermined performance indicator 126. Performance 124 can be related to a flicker percentage, a flicker index, or a flicker frequency.

In some embodiments, performance 124 can be derived by counting a number of images of illumination load 101 that show illumination load 101 is on, and counting a number of images of illumination load 101 that show illumination load 101 is off, and derive performance 124 based on various formulas related to a flicker percentage, a flicker index, or a flicker frequency, which are known to a person having ordinary skills in the art. In some other embodiments, performance 124 can be related to noise or other performance metrics for illumination load 101.

Flicker can be more or less apparent depending on several factors, primarily the relevant amount of variation in the light per cycle, the proportions of the lighting waveform, and the frequency (or frequencies) at which the light variation occurs. Flicker percent can be a measure of the maximum light vs. the minimum light in a cycle. Flicker percent only accounts for the minimum and maximum light outputs, and does not differentiate between waveforms. Flicker percentage or % flicker can be calculated with the following formula: % flicker=$100*A-B/A+B$, where A represents maximum light output and B minimum light output.

Flicker index is another common metric for describing the behavior in terms of the amount of light that a product produces over a given cycle. Flicker index requires more calculations than flicker percent, as there is consideration given to the shape of the waveform. Flicker index considers the area of the waveform above and below the average light output.

Similarly, predetermined performance indicator 126 can be associated with a dimming curve as shown in FIG. 4. In addition, predetermined performance indicator 126 can be based on various standards, such as IEEE 1789, ENERGY STAR® defined by EPA, California Title 20 and Title 24, IEC/TR 61547-1, CIE TC 1-83, Japan DENAN Law, and others.

FIG. 4 illustrates an example dimming curve 400 for a LED light, according to some embodiments. Dimming curve 400 can be used as a base to provide predetermined performance indicator 126. As shown in FIG. 4, dimming curve 400 can include a maximum dimming level, minimum dimming level, dead travel, or a rate of change of light output for the illumination load. The minimum dimming level is the minimum light level attainable with a dimmable system. The maximum dimming level is a maximum line voltage applied to illumination load 101 so that even when dimmer device 109 is at is maximum setting, the illumination load 101 does not receive the full voltage, but to receive the maximum line voltage instead. Dead travel occurs when there is no change in light output from illumination load 101 despite a change in dimmer device 109. In some embodiments, a dead travel area can be limited to no more than 10% at the top of the dimming curve, or bottom of the dimming curve.

Example Computer System

Figure 5:
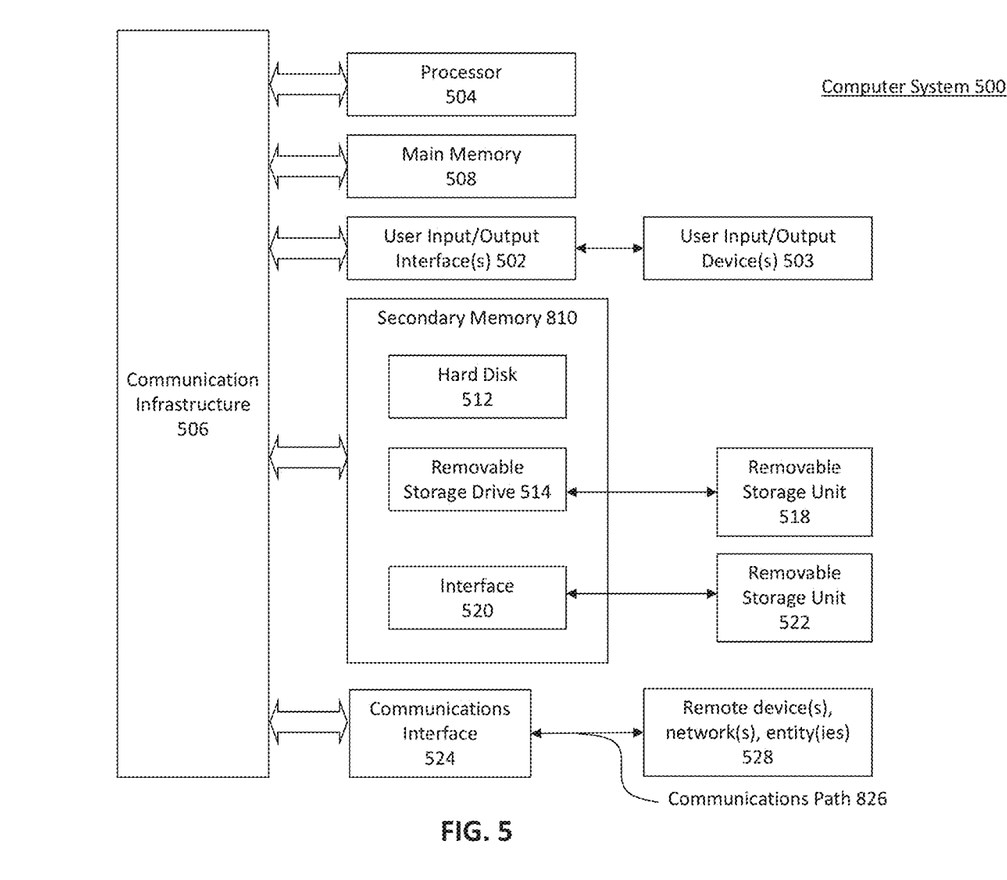
FIG. 5 illustrates an example computer system useful for implementing various embodiments.

Various embodiments may be implemented, for example, using one or more well-known computer systems, such as computer system 500 shown in FIG. 5. For example, dimmer device 109, monitor device 130, controller 102, processor 133, dimmer device 209a, dimmer device 209b, dimmer device 209c, may be implemented using combinations or sub-combinations of computer system 500 to perform various functions described herein, e.g., by process 300. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A dimmer device, comprising:
   a driver configured to be coupled to an illumination load; and
   a controller communicatively coupled to the driver, wherein the controller is configured to perform operations comprising:
      providing a control signal to the driver that indicates to the driver to adjust a dimming level of the illumination load, wherein the control signal is provided in response to a determination that a performance of the illumination load fails to satisfy a predetermined performance indicator, and wherein the performance of the illumination load is determined based on information related to a plurality of images of the illumination load taken by a camera of a monitor device; and
   wherein the driver is further configured to adjust the dimming level of the illumination load based on the control signal.

2. The dimmer device of claim 1, wherein the control signal indicates to the driver to adjust the dimming level of the illumination load by adjusting a power supplied to the illumination load.

3. The dimmer device of claim 1, wherein the control signal indicates to the driver to adjust the dimming level of the illumination load by adjusting an on and off time duty cycle for the illumination load.

4. The dimmer device of claim 1, further comprising the monitor device and wherein the controller is communicatively coupled to the monitor device.

5. The dimmer device of claim 1, wherein the monitor device is separate from the dimmer device and wherein the controller is configured to communicatively connect to the monitor device.

6. The dimmer device of claim 1, wherein providing the control signal comprises providing the control signal based on a command received from the monitor device, wherein the command is provided by the monitor device based on the determination that the performance of the illumination load fails to satisfy the predetermined performance indicator.

7. The dimmer device of claim 1, wherein providing the control signal comprises determining, based on the information related to the plurality of images of the illumination load, that the performance of the illumination load does not meet the predetermined performance indicator.

8. The dimmer device of claim 1, wherein the performance of the illumination load is related to at least one of a flicker percentage, a flicker index, or a flicker frequency.

9. The dimmer device of claim 1, wherein the predetermined performance indicator is associated with a dimming curve.

10. A method for operating a dimmer device that comprises a controller and a driver that is communicatively coupled to the controller, the method comprising:
    providing, by the controller, a control signal to the driver that indicates to the driver to adjust a dimming level of an illumination load, wherein the control signal is provided in response to a determination that a performance of the illumination load fails to satisfy a predetermined performance indicator, and wherein the performance of the illumination load is determined based on information related to a plurality of images of the illumination load taken by a camera of a monitor device; and
    adjusting, by the driver, the dimming level of the illumination load based on the control signal.

11. The method of claim 10, wherein the control signal indicates to the driver to adjust the dimming level of the illumination load by adjusting a power supplied to the illumination load.

12. The method of claim 10, wherein the control signal indicates to the driver to adjust the dimming level of the illumination load by adjusting an on and off time duty cycle for the illumination load.

13. The method of claim 10, wherein providing the control signal comprises providing the control signal based on a command received from the monitor device, wherein the command is provided by the monitor device based on the determination that the performance of the illumination load fails to satisfy the predetermined performance indicator.

14. The method of claim 10, wherein providing the control signal comprises determining, based on the information related to the plurality of images of the illumination load, that the performance of the illumination load does not meet the predetermined performance indicator.

15. The method of claim 10, wherein the performance of the illumination load is related to at least one of a flicker percentage, a flicker index, or a flicker frequency.

16. The method of claim 10, wherein the predetermined performance indicator is associated with a dimming curve.

17. A non-transitory computer-readable medium having instructions recorded thereon that, when executed by at least one computing device, cause the at least one computing device to perform operations comprising:
   generating a control signal that indicates to a driver to adjust a dimming level of an illumination load, wherein the control signal is generated in response to a determination that a performance of the illumination load fails to satisfy a predetermined performance indicator, and wherein the performance of the illumination load is determined based on information related to a plurality of images of the illumination load taken by a camera of a monitor device; and
   providing the control signal to the driver to adjust the dimming level of the illumination load.

18. The non-transitory computer-readable medium of claim 17, wherein the control signal indicates to the driver to adjust the dimming level of the illumination load by adjusting a power supplied to the illumination load.

19. The non-transitory computer-readable medium of claim 17, wherein the control signal indicates to the driver to adjust the dimming level of the illumination load by adjusting an on and off time duty cycle for the illumination load.

20. The non-transitory computer-readable medium of claim 17, wherein generating the control signal comprises determining, based on the information related to the plurality of images of the illumination load, that the performance of the illumination load does not meet the predetermined performance indicator.

* * * * *